Sept. 30, 1958    L. E. ELFES ET AL    2,853,843
MOUNTING MEANS FOR TRACTOR MOUNTED CUTTING ASSEMBLY
Filed Aug. 5, 1954    9 Sheets-Sheet 1

INVENTORS.
Lee E. Elfes &
BY    Leo J. Lorenz
Carlson, Pitzner, Hubbard & Wolfe
Attorneys INVENTORS.
Lee E. Elfes &
Leo J. Lorenz Sept. 30, 1958   L. E. ELFES ET AL   2,853,843
MOUNTING MEANS FOR TRACTOR MOUNTED CUTTING ASSEMBLY
Filed Aug. 5, 1954   9 Sheets-Sheet 3

INVENTORS.
Lee E. Elfes &
BY   Leo J. Lorenz
Carlson, Pitzner, Hubbard & Wolfe
Attorneys Sept. 30, 1958    L. E. ELFES ET AL    2,853,843
MOUNTING MEANS FOR TRACTOR MOUNTED CUTTING ASSEMBLY
Filed Aug. 5, 1954    9 Sheets-Sheet 4

INVENTORS.
Lee E. Elfes &
Leo J. Lorenz
BY
Carlson, Pitzner, Hubbard & Wolfe
Attorneys Sept. 30, 1958   L. E. ELFES ET AL   2,853,843
MOUNTING MEANS FOR TRACTOR MOUNTED CUTTING ASSEMBLY
Filed Aug. 5, 1954   9 Sheets-Sheet 5

INVENTORS
Lee E. Elfes &
Leo J. Lorenz
BY
Carlson, Pitzner, Hubbard & Wolfe
Attorneys

INVENTORS.
LEE E. ELFES &
LEO J. LORENZ
BY
ATTORNEYS.

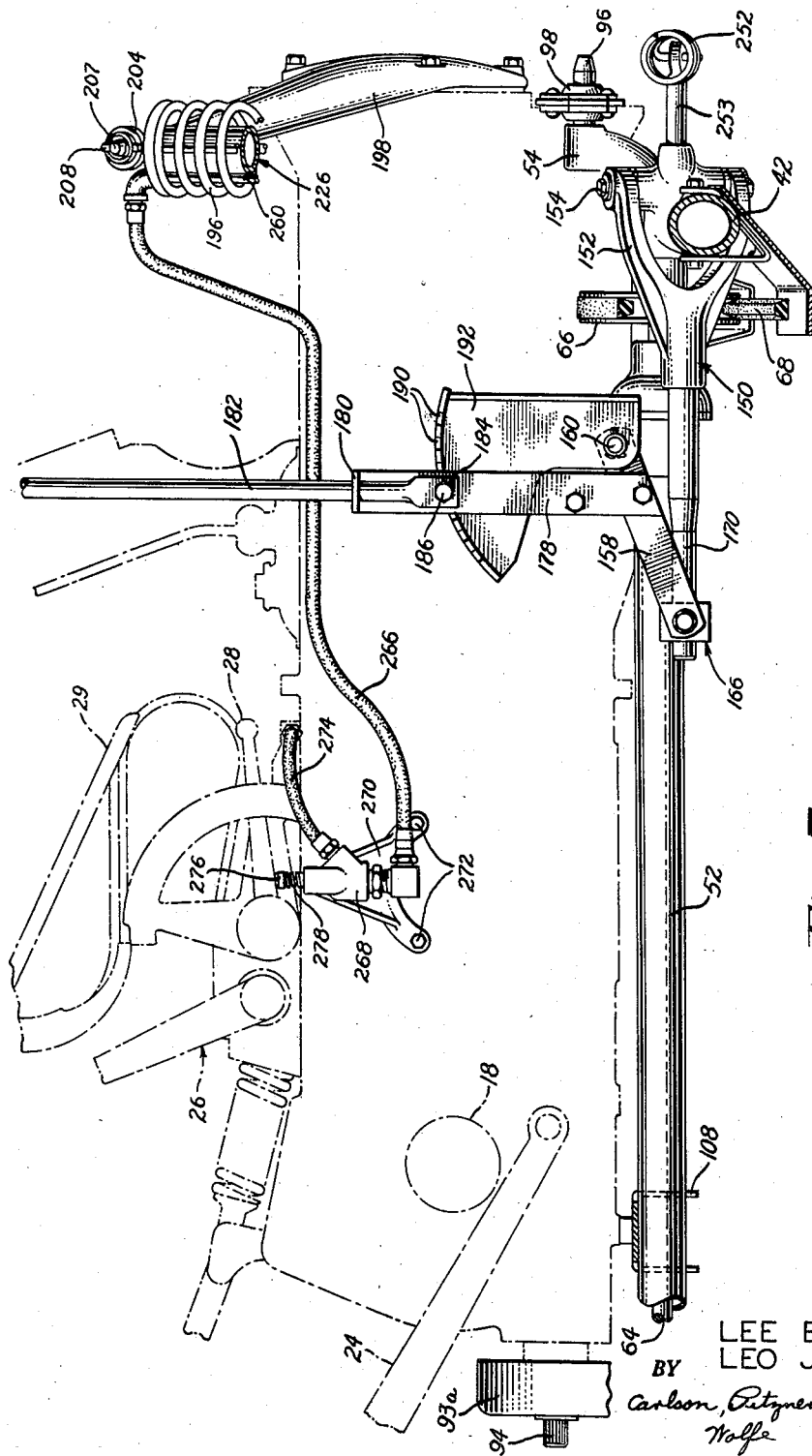

Sept. 30, 1958     L. E. ELFES ET AL     2,853,843
MOUNTING MEANS FOR TRACTOR MOUNTED CUTTING ASSEMBLY
Filed Aug. 5, 1954     9 Sheets-Sheet 8

INVENTORS.
Lee E. Elfes &
Leo J. Lorenz
BY Carlson, Pitzner, Hubbard & Wolfe
Attorneys Sept. 30, 1958  L. E. ELFES ET AL  2,853,843
MOUNTING MEANS FOR TRACTOR MOUNTED CUTTING ASSEMBLY
Filed Aug. 5, 1954  9 Sheets-Sheet 9

INVENTORS.
Lee E. Elfes &
Leo J. Lorenz
BY
Carlson, Pitzner, Hubbard & Wolfe
Attorneys ND United States Patent Office 2,853,843
Patented Sept. 30, 1958

2,853,843

MOUNTING MEANS FOR TRACTOR MOUNTED CUTTING ASSEMBLY

Lee E. Elfes, Birmingham, and Leo J. Lorenz, Detroit, Mich., assignors to Massey-Ferguson, Inc., a corporation of Maryland Application August 5, 1954, Serial No. 447,984

4 Claims. (Cl. 56—25)

The invention relates to tractor-operated mowers and more particularly mowers of the type adapted to be mounted on the body of a general purpose tractor and integrated with it so that the tractor and mower operate as a unitary machine.

This application is a continuation-in-part of our copending application Serial No. 347,192, filed April 7, 1953, now Patent No. 2,757,504.

Mowers of the above general character are commonly known as side-mounted or highway type mowers. Because of their maneuverability, ease in handling and overall efficiency, they have come into extensive use despite the fact that as presently constructed they are notoriously difficult to attach to and detach from the tractor. Such mowers usually comprise a number of parts that have to be handled separately and interconnected for operation after they have been mounted on the tractor. The actual mounting of the individual mower parts is an arduous and time consuming task. Some of the parts are heavy and awkward to handle, particularly those that have to be held in a raised position while being bolted or otherwise attached to the tractor frame. To complicate matters, attachment must sometimes be made at the side of the tractor opposite to that at which it is necessary to stand in order to lift a part into attaching position.

One object of the invention is to provide a mower embodying novel features of construction which materially simplify the task of mounting it on or dismounting it from a tractor, and which enable either job to be done quickly and with a minimum of physical effort.

Another object is to provide improved means for driving a side-mounted mower from the rear power take-off of a tractor, which mechanism is compact and sturdy and completely free of universal joints.

Another object is to provide improved mechanism for retaining the cutter bar in operative position while permitting it to swing back when an obstruction is encountered.

Still another object is to provide improved means for adjusting the fore-and-aft tilt of the cutter bar.

A further object is to provide a mower of the above general character in which the drive mechanism, the cutter bar, the break back mechanism, the tilt adjusting mechanism and the lift mechanism are constructed and arranged for assembly with a supporting frame as a unitary structure adapted for mounting on and dismounting from the tractor as a unit by means of simple, easily accessible attaching devices, including elements that may be installed and left on the tractor permanently without interfering in any way with its use with other implements.

It is also an object of the invention to provide a rugged and durable side-mounted mower which can be produced economically, which is easy to manipulate when attached to a tractor and which is efficient and reliable in operation.

Other objects and advantages of the invention will become apparent from the following detailed description of the preferred embodiment illustrated in the accompanying drawings, in which Figure 1 is a plan view of a mower embodying the features of the invention, the mower being shown as mounted on a tractor.

Fig. 7 is a sectional view similar to Fig. 4 showing the earlier form of the mower.

Figure 1:
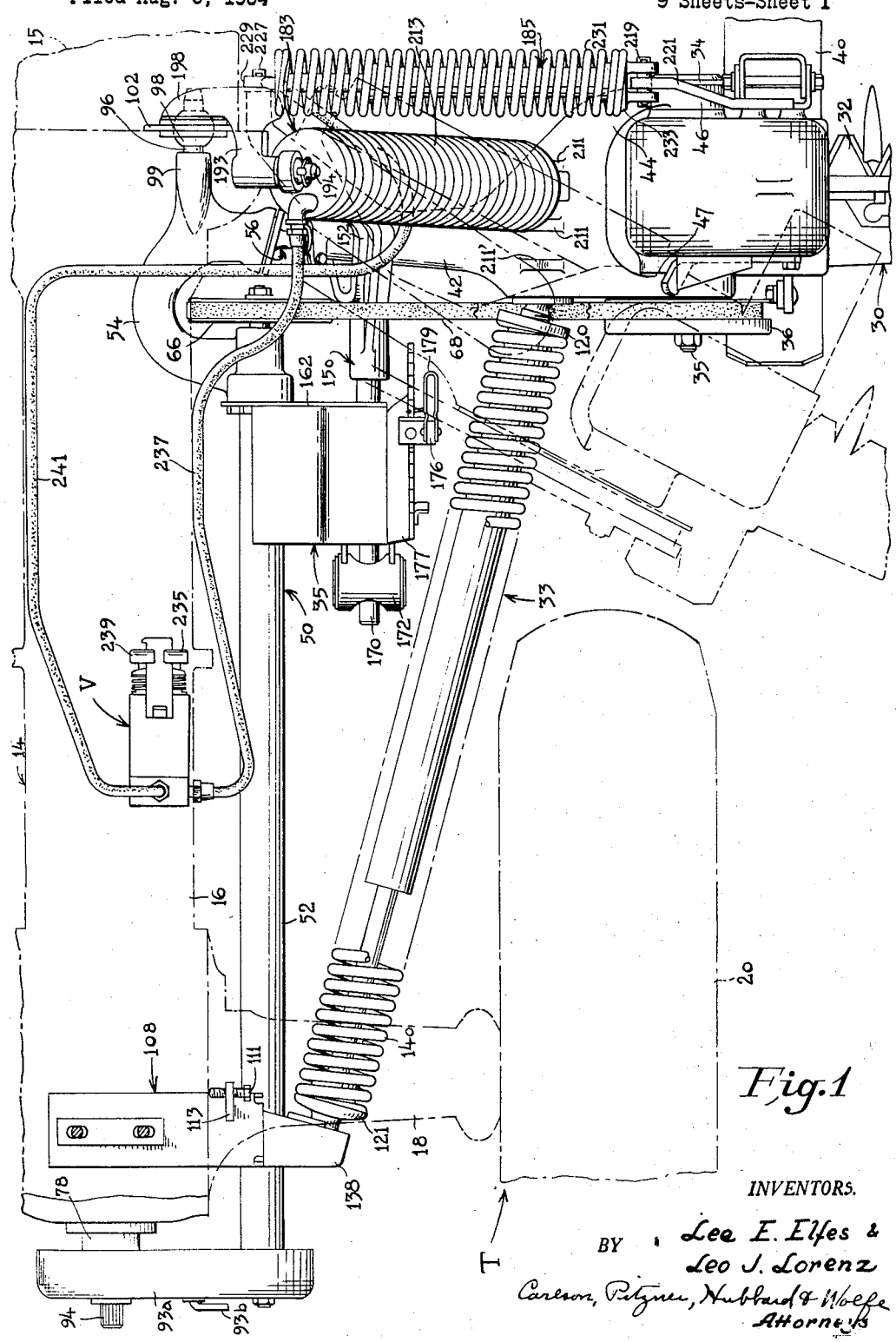

While the invention is susceptible of various modifications and alternative constructions, there is shown in the drawings and will be described in detail the preferred embodiment and an earlier form thereof, but it is to be understood that it is not thereby intended to limit the invention to the forms illustrated but it is intended to cover all modifications and alternative constructions falling within the spirit and scope of the invention as expressed in the appended claims.

By way of orientation in the art, the mower herein disclosed may, in general, be considered as an improvement on the side-mounted mower illustrated and described in an instruction manual entitled "Heavy Duty Mower P–EO–A 21—Operating and Assembly Instructions" published in 1949 by Harry Ferguson, Inc. of Detroit, Michigan. It is designed for mounting on a tractor T having means for supplying fluid under pressure for operating the cutter bar positioning means of the mower. When mounted on a tractor equipped with a hydraulically operated implement hitch, such as the "Ferguson" tractor, pressure fluid may be taken from the tractor hydraulic system. In the particular tractor illustrated, which may be of the general type disclosed in the related co-pending application of Ernest V. Bunting, Serial No. 418,057, filed March 3, 1954, now abandoned, and assigned to the same assignee as the present application provision is made for connection with the hydraulic system by interchanging a suitable fitting with a cover plate provided on the tractor center housing.

As an aid to understanding the problems involved in mounting a mower on and integrating it with a tractor, it will be well to consider briefly the general construction of the tractor. Referring to Figs. 1, 4, 9 and 10 of the drawings, the exemplary tractor has an elongated body 14 comprising an engine 15 and a center housing 16 assembled with the engine forward and joined as a rigid unitary structure by bolts inserted through mating flanges on the respective parts. Extending from opposite sides of the center housing adjacent its rear ends are axle housings 17 and 18 (Fig. 13) supporting the tractor's rear drive wheels 20. The wheels are driven from the tractor engine in a well-known manner through a selective change-speed transmission actuated by a manual shift lever 19 and a differential enclosed in the center housing.

Figure 10:
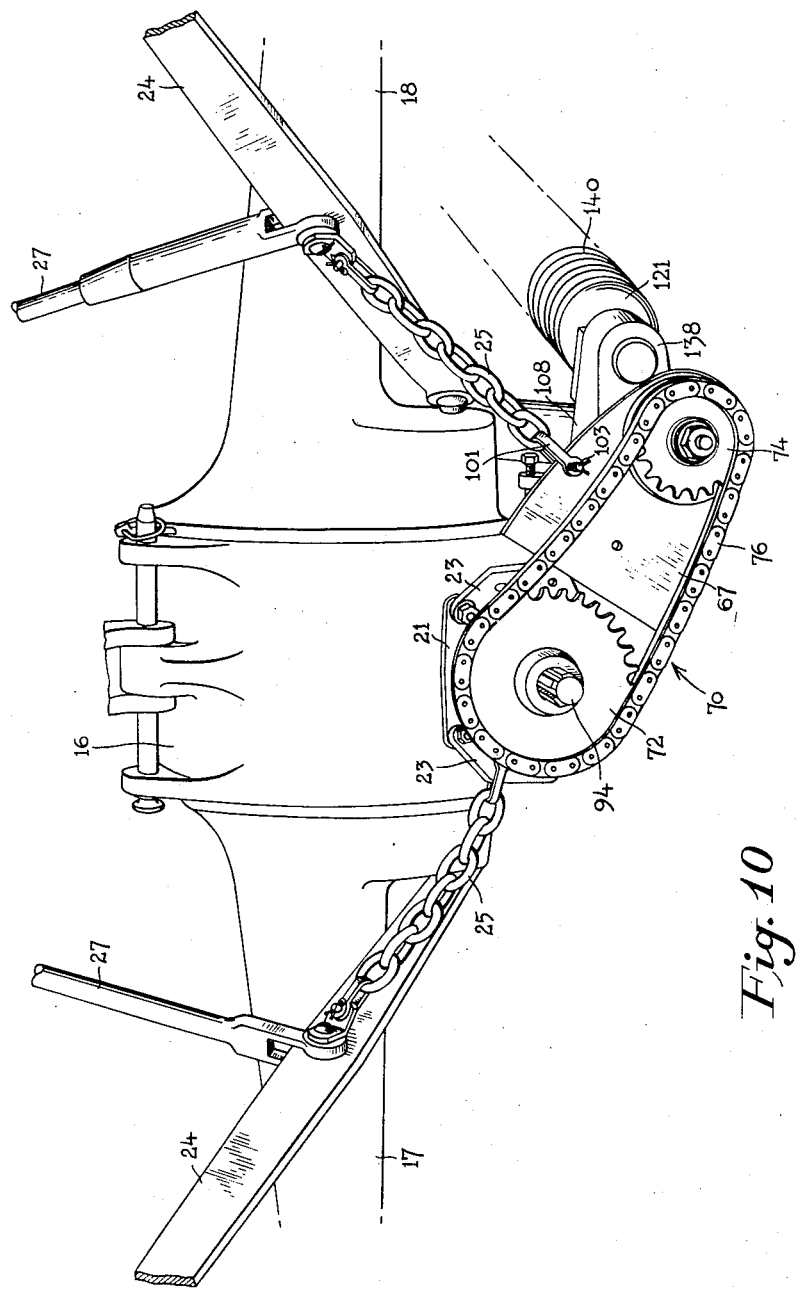
Fig. 10 is a fragmentary rear end view of the tractor and mower showing the manner in which the tractor draft links are utilized to lift the mower into position for attachment to the tractor.

Tractors of the type shown are equipped with a rear power take-off shaft 22 (Figs. 3 and 7) adapted to be driven from the tractor engine. The power take-off shaft projects rearwardly of the center housing and through a pad 21 formed thereon which has suitable threaded holes for attachment of a cover or for the mounting of certain accessories with which the present invention is not concerned. When the mower is mounted on the tractor, the above-mentioned cover is removed for attachment of the mower drive mechanism to be described later and the pad 21 provides anchorage for a pair of brackets 23 (Fig. 10).

Trailingly pivoted on the center housing 16 are a pair of draft links 24 by which rear mounted implements are coupled to the tractor. Check chains 25 connected between the draft links and the brackets 23 limit the lateral swing of the links. The draft links are raised and lowered by a hydraulic lift mechanism enclosed in the center housing and acting through crank arms 26 on a lift shaft 25' journaled on a cover plate 26' closing the upper portion of the center housing. Drop links 27 connect the arms 26 with the draft links 24.

In so far as the present invention is concerned, the tractor hydraulic system simply provides a source of fluid under pressure for certain operations of the mower to be described presently and for preliminary lifting of the mower in the process of mounting it on the tractor. While the hydraulic system may be of any suitable character, the system disclosed in the Bunting application above referred to is particularly well suited for the purpose. For present purposes it is sufficient to note that the system includes an engine driven pump adapted to deliver fluid under pressure to an actuator associated with the lift shaft 25'. Control of the system is effected through the medium of a pair of manually operable levers 27 and 28, the latter being the control lever while the lever 27 constitutes what may be termed a depth setter. By appropriate manipulation of these levers, the draft links may be selectively positioned and the hydraulic system conditioned for supplying fluid under pressure to the mower. These levers are mounted on the tractor within convenient reach of the driven when occupying the seat 29.

The improved mower is adapted to be mounted directly on the body of the tractor, that is, independently of the implement hitch linkage which includes the draft links 24. The linkage is thus left free for attachment of other implements to the tractor which can be operated in the usual manner without requiring removal of the mower or alternatively can be retained on the tractor while the mower is operated alone. As an example, a side delivery rake or the like may be coupled to the tractor hitch linkage so that the operator can switch from mowing to raking or vice versa, as desired. It will be understood, of course, that the mower and the rake or other implement attached to the hitch linkage can be operated simultaneously if desired.

As in conventional mowers, the main operating element of the improved mower is an elongated cutter bar 30. The cutter bar is supported for pivoting movement about a fore-and-aft axis at the outer end of a drag bar 42 which, at its inner end, is supported for universal swinging and swiveling movements on a frame structure 50 mounted on the tractor. Power actuating means, in this instance hydraulically operated, is provided for swinging the cutter bar and the drag bar between their operating and inactive positions shown, respectively, in solid and broken lines in Fig. 2. Break back mechanism 33 normally holds the cutter bar in laterally projecting relation to the tractor, as shown in full lines in Fig. 1, but permits it to swing rearwardly to the position shown in broken lines in case the cutter bar strikes an obstruction. Mechanism 35 is provided for rocking the drag bar and attached cutter bar about an axis transverse to the tractor to adjust the fore-and-aft tilt of the latter.

To obtain its broad objective of simplifying attachment and detachment, the major components of the mower referred to generally above, together with mechanism for driving the cutter bar from the power take-off shaft, are constructed and assembled to form a unitary structure adapted to be mounted on and dismounted from the tractor as a unit. In other words, the various elements of the mower are assembled and more or less permanently interconnected before they are mounted on the tractor and the assembly remains intact after removal of the tractor. This materially reduces the labor involved and shortens the time required for mounting and dismounting, and, in addition, insures proper interconnection and adjustment of the mower parts. Furthermore, handling and storage of the mower is simplified and loss or misplacement of parts is avoided.

Figure 2:
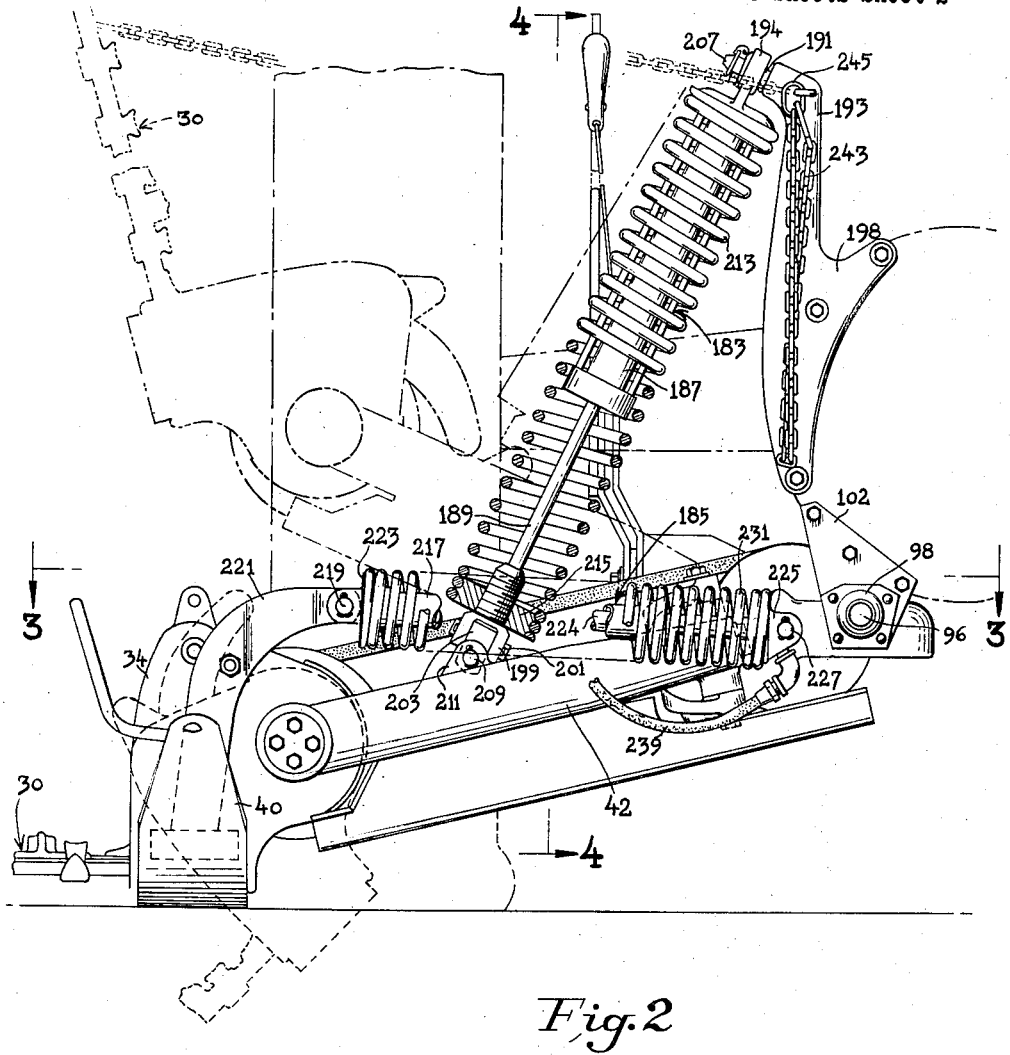
Fig. 2 is a front elevational view with parts broken away and shown in section of the mower shown in Fig. 1.

Turning now to a more detailed description of the exemplary mower and referring to Figs. 1 and 2 of the drawings, the cutter bar 30 may be of any preferred form, including an elongated toothed knife 32 reciprocated by a driving head 34 to which the inner end of the bar is attached. The drivehead 34 likewise may be of any preferred character and as shown is adapted to receive power by way of a pulley 36 fixed on the projecting end of a shaft 35 journaled in the head. The head also carries a ground shoe 40 adapted to ride along the surface of the ground when the mower is in operation. It will be understood, of course, that the cutter bar may also be provided at its outer end with a conventional ground shoe which with the shoe 40 serves to hold the cutter bar clear of the ground.

As shown in Figs. 1 and 2, the cutter bar 30 is supported on the drag bar 42 through the medium of the drivehead 34. For this purpose the outer end of the drag bar is bifurcated to form a yoke 44 adapted to straddle the head and the latter is pivotally supported on the legs of the yoke as by front and rear trunnions 46 and 47. It may be noted that the shaft 35 is located coaxially of the trunnions so that the cutter bar and drivhead may be swung about their pivots on the drag bar without interfering with the drive.

The frame structure 50 constitutes the backbone of the mower and ties the elements together into a unitary structure, and, in addition, serves to support the major elements of the mower on the tractor. In its preferred form, the frame structure 50 comprises an elongated tubular rear member 52 rigidly joined to the rear leg of a U-shaped front member 54 disposed so as to open laterally of the rear member. Preferably, the drag bar 42 is mounted on the forward leg of the member 54 by a suitable joint 56 permitting universal swinging and swiveling of the bar. The joint 56, as shown, is a ball and socket joint comprising a ball element 58 (Fig. 3) fixed on or rigidly secured to the inner end of the drag bar and seated in an outwardly facing spherical socket 60 formed in the member 54. A retaining nut 62 threaded into the mouth of the socket retains the ball element therein.

Figure 3:
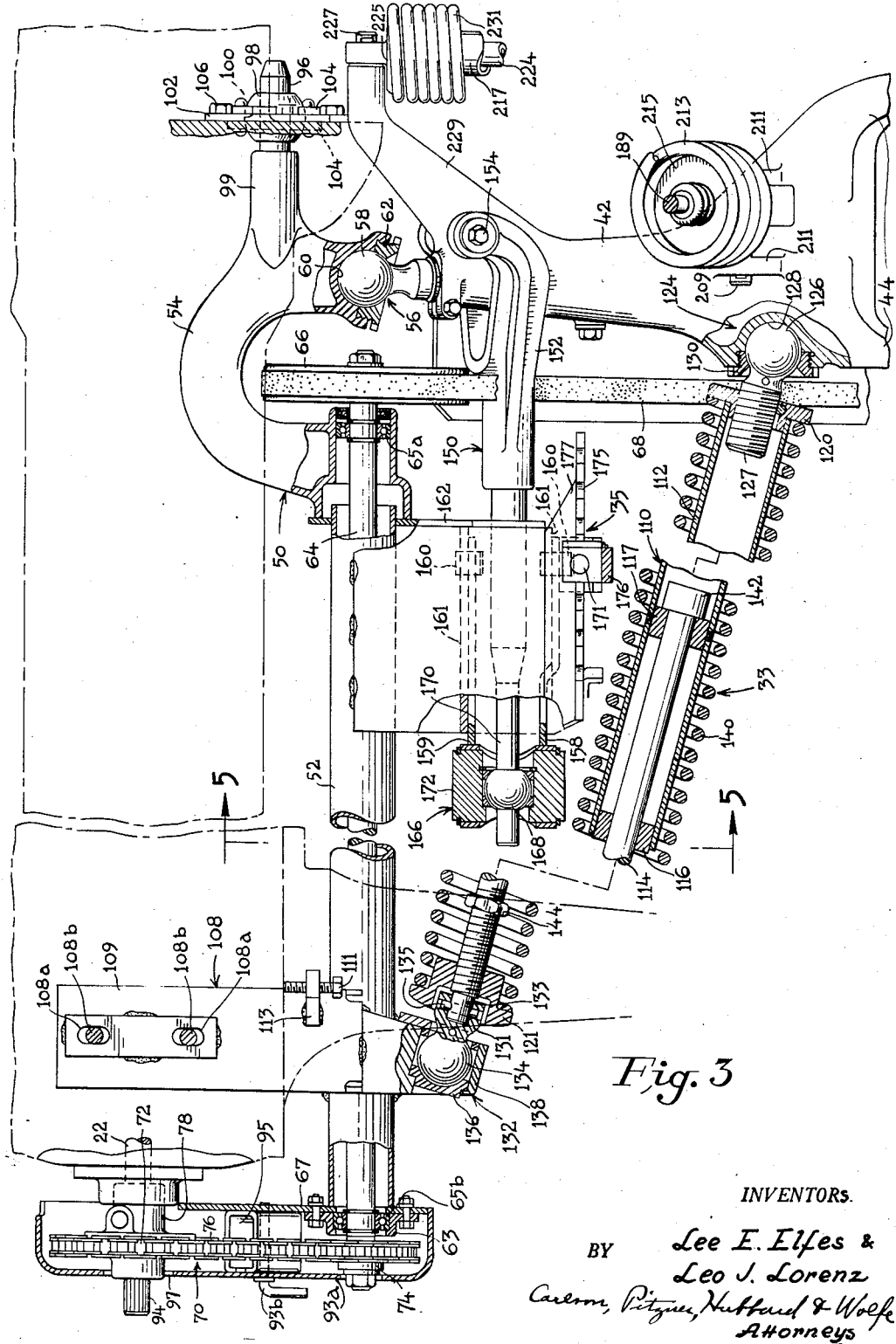
Fig. 3 is a fragmentary sectional view of the mower taken in a horizontal plane substantially on the line 3—3 of Fig. 2.
Figure 4:
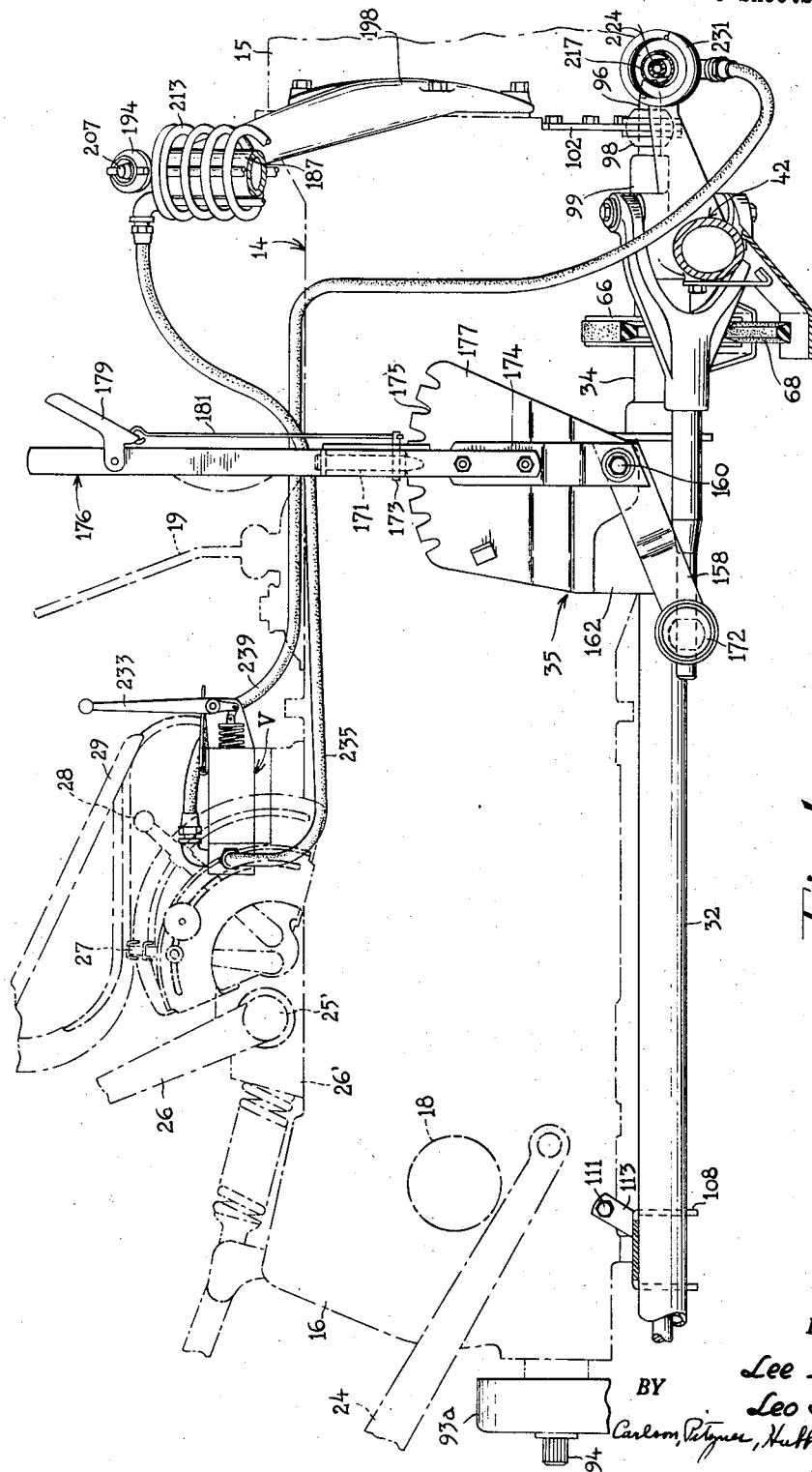
Fig. 4 is a fragmentary sectional view of the mower taken in a vertical plane substantially on the line 4—4 of Fig. 2.

The frame structure 50, as indicated above, supports the mechanism for driving the cutter bar from the tractor power take-off shaft which is characterized by its compactness and simplicity. Thus, the drive mechanism includes a shaft 64 extending axially through the tubular frame member 52 and journaled in front and rear bearings 65a and 65b (Fig. 3). The bearing 65a as shown is seated in a recess in the front frame member 54 disposed so as to aline the shaft 64 axially with the axis of the ball joint 56. Bearing 65b is carried in a retainer 63 bolted or otherwise secured to a heavy plate fixed to the rear end of the frame member 52.

The shaft 64 projects into the space between the legs of the frame member 54 and on its projecting end carries a pulley 66 drivingly connected with the pulley 36 of the drivehead by a V-belt 68. It will be observed that the U-shaped form of the frame member 54 provides clearance for the pulley 66 and permits the shaft 64 to be coaxially alined with the axis of the ball and socket joint 56. Thus, as the drag bar and cutter bar are swung vertically about the joint 56, the distance between the pulleys 36 and 66 remains constant so that the tension of the belt is not affected nor the drive interfered with in any way.

It will also be noted that the improved drive mechanism is free of universal joints which are expensive to manufacture and difficult to maintain. Furthermore, it imposes no restraint on the drag bar so that the latter may swing rearwardly with the cutter bar as a unit when the latter strikes an obstruction. The longer lever arm thus provided insures a quick and effective break-back action when the cutter bar strikes an obstruction anywhere along its length, and particularly when the obstruction is met by the inner end of the bar.

Figure 8:
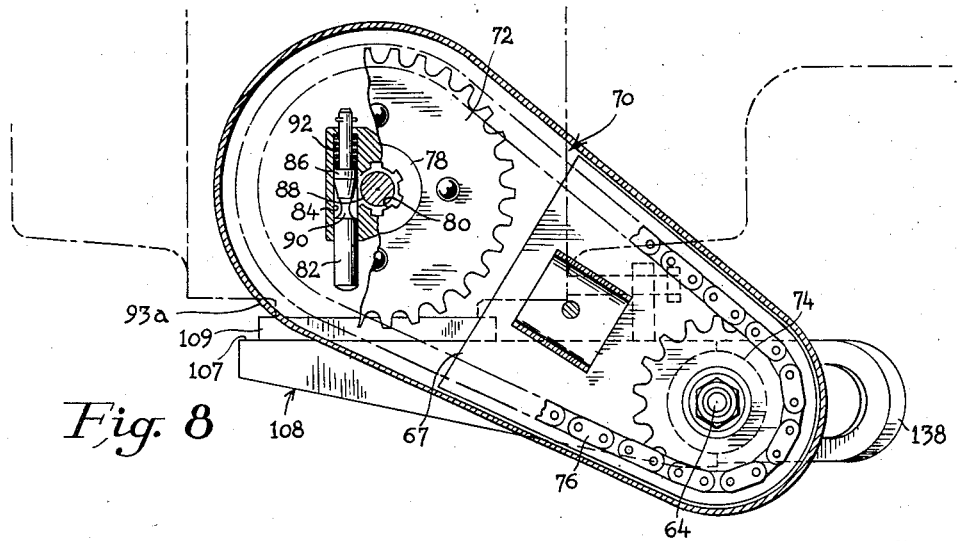
Fig. 8 is a rear elevational view of the mechanism coupling the mower to the tractor power take-off shaft, the cover normally enclosing the mechanism being broken away and shown in section.
Figure 5:
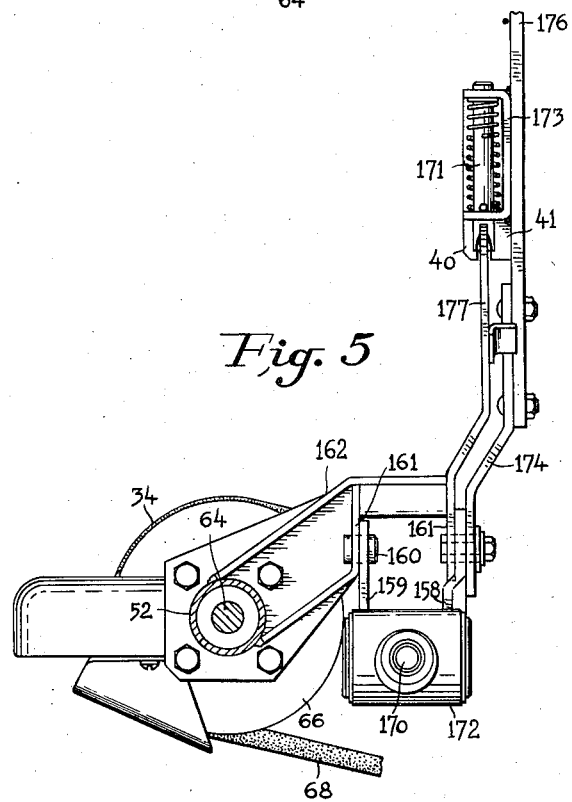
Fig. 5 is a fragmentary transverse sectional view taken in a plane substantially on the line 5—5 of Fig. 3.

Connection between the drive shaft 64 and the power take-off shaft 22 of the tractor is effected through the medium of a chain-type drive 70 (Figs. 3 and 8). As herein shown, the drive comprises a sprocket 72 on the power take-off shaft and a sprocket 74 on the shaft 64. A roller chain 76 drivingly connects the sprockets. Preferably the sprocket 72 is drivingly coupled to the power take-off shaft 22 by a quick detachable coupling, such as the spring detent shown in Fig. 8. Thus, the sprocket has a hub 78 formed with a splined bore 80 adapted to receive the shaft. A locking plunger 82 slidable in a transverse bore 84 in the hub 78 has a locking enlargement 86 adapted to interlock with a peripheral notch or groove 88, conventionally provided in power take-off shafts. A spring 92 biases the plunger to locking position but permits manual shifting of the plunger so as to bring a reduced portion 90 thereof into registration with the groove so that the sprocket can be slipped off the shaft.

As a safety precaution, the drive 76 is covered by a removable guard 93a. As shown in Fig. 3, the guard is clamped by a screw 93b to a spacing member 85 welded or otherwise secured to the rear face of the plate 67.

To provide for driving a rear mounted implement from the tractor power take-off shaft while the mower drive is in place, the sprocket 72 is provided with a rearwardly projecting stub shaft 94 suitably splined for accommodation of standardized drive fittings. This hub, as shown in Fig. 3, is arranged to project through a suitable opening 97 in the guard 93a so that the connection may be made without removal of the guard.

The unitary assembly of the mower elements with the frame 50 contributes substantially to the ease of mounting and dismounting the mower and those operations are further simplified and facilitated by the novel mode of attachment of the frame to the tractor. More particularly, provision is made for attaching the frame to the tractor at two points spaced apart fore and aft of the tractor, the attaching means comprising simple, easily applied attaching elements. Thus at the front end of the frame there is provided a connecting element in the form of a pin 96 adapted for engagement with a cooperating apertured element 98 permanently mounted on the body of the tractor. In the particular form of the frame illustrated, the pin 96 is suitably anchored in a boss 99 integral with and projecting forwardly from the frame member 54.

The apertured connecting element 98 is preferably in the form of a ball and is supported for free turning movement in a socket 100 formed in an apertured mounting bracket 102 and a pair of retaining plates 104 secured at opposite sides of the bracket. The bracket 102 may be conveniently secured to the tractor as by bolts 106 which are normally provided for joining the abutting flanges of the engine and the housing 16. The bracket projects only a short distance laterally of the tractor body and interferes in no way with the normal operation of the tractor. Accordingly, it may be left in place when the mower is dismounted so that remounting is further facilitated.

For attaching the rear portion of the frame 50 to the tractor, a laterally projecting bracket 108 is welded or otherwise secured to the frame member 52 adjacent its rear end. The bracket which may comprise a metal stamping is channel shaped in cross-section and is disposed in inverted position so as to present its upper face 107 as a flat, horizontal bearing surface adapted to fit flush against a pad 109 provided on the tractor center housing for mounting a swinging draw bar. Slots 108a in the bracket are spaced apart to receive the bolts 108b ordinarily supplied for attachment of the draw bar. The slots are elongated in a direction to permit lateral swinging of the frame about the axis of the ball 98 as a pivot after attachment of the bracket 108 to the tractor. Thus, the frame may be swung inwardly of the tractor to permit easy placement of the chain 76 over the sprockets 72 and 74 after which the frame can be swung outwardly to tension the chain. The bolts 108b of course are tightened when the frame is properly positioned and they, together with an adjusting screw 111, securely hold the frame in such position. As shown in Fig. 3, the adjusting screw is threaded through a lug 113 welded to the upper face of the bracket 108 and its inner end is disposed for engagement with an adjacent portion of the tractor center housing.

To facilitate the mounting of the mower, provision is made for utilizing the lift mechanism of the tractor for raising the rear end portion of the mower assembly into position for attachment of the bracket 108 to the tractor body. For this purpose provision is made for temporarily connecting the frame structure with one of the draft links 24. The check chain 25 of the right hand link may be used conveniently for such connection, the chain normally being connected to the bracket 23 by means of a clevis 101 and pin 103. As shown in Fig. 10, the back plate 67 of the drive mechanism housing is apertured adjacent its upper edge so that the chain 25 may be connected thereto by the clevis and the pin 103. Accordingly, after the front mounting pin 96 has been inserted in the ball 98, the rear end of the frame structure may be raised by elevating the draft links sufficiently to allow the bracket 108 to be secured in place as above described. After the bracket is bolted into place, the chain connection is re-established with the bracket 23.

The break-back mechanism 33 which normally holds the cutter bar in correct operating position while permitting it to swing rearwardly when an obstruction is encountered, comprises a spring loaded compression member 110 connected between the drag bar 42 and the frame structure 50. As shown in Fig. 3, the compression member 110 comprises a pair of telescopingly assembled elements including an outer element in the form of a tube or cylinder 112 and an inner element or rod 114. The latter is disposed axially within the tube and is slidably supported in guide collars 116 and 117 fitted in the tube. Mounted on the telescoped elements 112 and 114 are front and rear plugs 120 and 121, the front plug being welded or otherwise rigidly fixed to the forward end of the tube 112 while the rear plug 121 has a threaded connection with the rod 114. The compression member is connected at the forward end to the drag bar 42 by connecting means 124, permitting universal pivotal movement between the parts. The connecting means as shown is of the ball and socket type comprising a ball 126 formed at the end of a stud 127 screw-threaded into the front plug 120. The ball is adapted to seat in a socket 128 formed in and opening rearwardly of the drag bar 42. A retainer nut 130 threaded into the mouth of the socket retains the ball in place.

A similar ball and socket connection 132 secures the other end of the compression member to the frame structure. As shown in Fig. 3, the connection comprises a ball 134 having an integral shank portion 131 apertured to receive the reduced end portion 133 of the rod 114. A cross pin 135 inserted through the shank and rod secures the parts together. The ball 134 seats in a spherical socket defined by a member 136 mounted in an extension 138 of the bracket 108 which, as previously explained, is fixed to and supports the tubular frame member 52 on the tractor housing.

Disposed around the telescopingly engaged members 112 and 114 is a coiled compression spring 140 having its ends abutting circumferential flanges on the front and rear plugs 120 and 121. Adjustment of the loading of the spring 140 may be effected by screwing the plug 121 along the rod 114. To limit extension of the telescoping members beyond the length required to locate the cutter bar in operating position, the rod 114 is formed at its forward end with an enlarged head 142 engageable with the guide sleeve 117 in the tube 112. Collapse or contraction of the telescoping elements is similarly limited by a stop nut 144 threaded on the rod 114 and engageable by the guide sleeve 116.

In the above arrangement, the cutter bar is held substantially at right angles to the axis of the tractor as long as normal operating conditions prevail. If the cutter bar encounters an obstruction which is sufficiently unyieldable to overcome the force of the spring 140, the cutter bar and drag bar swing rearwardly on break back about the ball and socket joint 56 as a pivot. Such rearward movement is limited to substantially the position in which the parts are shown in broken lines in Fig. 1, as determined by the position of the stop nut 144, the setting automatically being such as to prevent the cutter bar from hitting the adjacent rear wheel of the tractor.

It will be evident that the force required to initiate a break back of the cutter bar is dependent upon the initial loading of the spring 140 as determined by the adjustment of the plug 121 along the rod 114. This makes for dependable, consistent operation of the break-back mechanism since the strength and adjustment of the spring are not subject to variation due to uncontrolled factors, such as corrosion, faulty or inadequate lubrication or accumulation of dirt on the working parts. The frictional resistance offered by the spring-loaded compression loader 110 itself is negligible. This is in contrast with the conventional latch-type break-back mechanism in which the interaction of frictional force is a vital factor in determining the force required to initiate a break-back operation. Rust and other factors of deterioration are likely to cause erratic variations in the action of such conventional arrangement and of course such variations are completely avoided by the improved mechanism.

When an obstruction is encountered by the cutter bar, the spring 140 absorbs the shock of the impact. Normally, the operator of the tractor will stop the tractor as soon as break back occurs. In the event that the cutter bar should reach the limit of its rearward swinging movement before the tractor can be halted, the energy absorbing action of the spring will substantially reduce the peak loading on the implement. There is no such energy absorbing action in the conventional latch type break-back mechanism since the resistance offered by such mechanisms drops substantially to zero once break back has been initiated. Furthermore, since the spring-loaded break-back mechanism 110 of the improved mower is carried between the drag bar and the frame structure 50 of the mower, no separate connection to the tractor is required.

It may also be noted that with the construction and arrangement shown, reciprocation of the cutter bar is automatically interrupted upon the occurrence of a break back. Such interruption is effected automatically by the slacking off of the drive belt 68 which takes place by reason of the fact that the pivotal axis of the drag bar at the ball and socket joint 56 is offset forwardly from the drive pulley 66 on the shaft 64. Thus the swinging of the drag bar in a horizontal plane is effective to interrupt the drive for the cutter bar while the driving connection is retained during vertical swinging of the drag bar.

Also included in the unitary mower structure is the tilt mechanism 35 for adjusting the fore-and-aft tilt of the cutter bar 30. In the exemplary mower, such adjustment is effected by rocking the drag bar 42 about its longitudinal axis on the ball and socket joint 56. For this purpose, a rearwardly extending, generally horizontal lever 150 is articulated to the drag bar. To accommodate rearward swinging of the drag bar and to make allowances for its generally downward inclination, the lever 150 has a pivotal connection with the drag bar. In the particular form shown, the forward end of the lever is bifurcated to define a yoke 152 adapted to straddle the drag bar and is pivotally connected to it by means of a bolt 154. As will be seen by reference to Fig. 3 of the drawings, the bolt is disposed transversely of the respective longitudal axes of the drag bar and the lever 150 so that the drag bar may be rocked about its axis by raising or lowering the aft end of the lever.

Manually operable means is provided for rocking the lever 150 in a generally vertical direction for effecting the tilt adjustment. This means, as shown, comprises a pair of rigid links 158 and 159 disposed in spaced parallel relation on opposite sides of the lever 150 and pivoted at their forward ends by pins 160 to the depending flanges 161 of a bracket 162 welded or otherwise rigidly fixed to the frame 50 and projecting laterally therefrom. At their aft ends the links 158 and 159 are connected with the lever 150 for universal pivoting, swiveling and sliding movement by means of a universal connector 166 comprising, in this instance, an apertured ball 168 slidably positioned on a cylindrical extension 170 of the lever. The ball 168 is seated in a socket formed in a cake 172 rigidly secured to the respective links.

Welded or otherwise rigidly fixed to one of the links, in this instance the link 158, is an upwardly extending arm 174 to which a hand lever 176 is secured. As will be seen by reference to Fig. 4 of the drawings, the hand lever is disposed within easy reach of the driver occupying the seat 29. The hand lever is provided with suitable means for releasably locking it in selected positions of adjustment to retain the drag bar in a desired angular position. The latch means, as shown, comprises a latching pin 171 slidably supported for endwise movement in guides 173 provided on the hand lever. At its lower end the pin is tapered for engagement with notches 175 in a segmental locking plate 177 rigid with and extending upwardly along the outer side of the bracket 162. The latching pin is adapted to be moved between latching and release position by means of a grip lever 179 pivoted adjacent the upper end of the hand lever 176 and connected with the pin by a suitable link 181.

It will be evident that the forward swinging of the lever 176 will serve to rock the lever 150 upwardly and thereby swing the drag bar 42 clockwise about its longitudinal axis. Accordingly, the leading edge of the cutter bar will be tilted downwardly relative to the trailing edge. Conversely, when the hand lever is swung rearwardly, the drag bar will be rocked in the opposite direction and the leading edge of the cutter bar will be tilted upwardly. The cutter bar may be retained in any adjusted position by simply engaging the latch pin 171 in an appropriate notch of the locking segment.

The power actuating means for raising and lowering the cutter bar and the drag bar may take various forms according to the particular type of service for which the mower is intended. Actuating means particularly suitable for heavy duty service, such as that required in highway mowers, is illustrated in Figs. 1, 2, 7 and 8 of the drawings. The actuating mechanism shown in Figs. 1 and 2 is disclosed and claimed in our related co-pending application Serial No. 446,821, filed July 30, 1954, while that shown in Figs. 6 and 7 constitutes the subject matter of our related co-pending application Serial No. 347,192, filed April 7, 1953, both assigned to the assignee of the present application. Actuating means suitable for light duty service and capable of being substituted for heavy duty mechanism shown in Figs. 1 and 2 without requiring any structural changes in or modification of the mower is disclosed and claimed in our related co-pending application Serial No. 436,136, filed October 19, 1954, now Patent No. 2,788,873, and assigned to the assignee of the present application.

Referring more particularly to Figs. 1 and 2 of the drawings, the heavy duty actuating means comprises two independently operable hydraulic actuators 183 and 185. The actuator 183 is utilized, in this instance, for raising and lowering the drag bar and of course the inner end of the cutter bar, while the actuator 185 serves to swing the cutter bar 30 and drivehead 34 about their pivot on the drag bar.

As shown in Figs. 1 and 2, the actuator 183 comprises a cylinder 187 adapted to be anchored to the body of the tractor and fitted with a piston having a rod 189 pivotally connected to the drag bar 42. Thus, the arrangement is such that upon admission of pressure fluid to the lower end of the cylinder, the drag bar will be swung upwardly from the position shown in full lines in Fig. 2 toward the raised position shown in broken lines in that figure. When the cylinder is opened to exhaust, the drag bar descends toward the working position.

The connection of the cylinder 187 with the tractor is effected through the medium of a bracket 198 adapted to be bolted or otherwise attached to the mating flanges of the center housing and engine by the same bolts that secure those parts together. Bracket 198 is formed with an upright arm 193 which carries an upwardly and outwardly projecting pin or stud 207 adapted to engage in an apertured ball 191 socketed in a lug 194 extending axially from the closed end of the cylinder 187. The actuator is thus supported on the tractor for universal pivoting movement so that it can accommodate itself to both vertical and lateral swinging of the drag bar. It will be understood that the bracket 198 may be permanently mounted on the tractor and the actuator is attached and detached by simply slipping the ball 191 on or off the stud 207.

For connection with the drag bar 42, the piston rod 189 is provided at its lower end with a bifurcated head 199 connected by a pin 201 with a link 203 which in turn is pivoted on a pin 209 carried between a pair of upstanding lugs 211 on the drag bar 42. As shown in Fig. 1, a third lug 211' is provided on the drag bar at one side of and in alinement with the lugs 211 for the accommodation of other types of lift mechanism, as for example, that disclosed in our co-pending application above referred to.

Provision is made for partially counterbalancing the weight of the drag bar and cutter bar assembly so that the cutter bar can ride more easily along the surface of the ground and follow irregularities in the ground contour. As shown in Fig. 2, the counterbalancing means includes an extensible coiled spring 213 encircling the actuator 183. The spring is suitably anchored at its upper end to the closed end of the cylinder 187 and at its lower end to a collar 215 threaded on the shank portion of the piston rod head 199. The tension of the spring and thus its effectiveness in counterbalancing the weight of the assembly can thus be adjusted by screwing the collar along the shank.

The actuator 185 for the cutter bar comprises a cylinder 217 having its closed end pivotally connected as by a pin 219 with one end of a bell crank lever 221 bolted or otherwise rigidly attached to the drivehead 34. A piston working in the cylinder is connected by a hollow piston rod 224 with a plug 225 pivoted on the drag bar 42, in this instance, on a pin 227 carried by an arm 229 integral with the bar. The arrangement is such that upon admission of pressure fluid to the inner end of the cylinder, the latter is retracted and the cutter bar tilted upwardly or toward the inactive position shown in broken lines in Fig. 2. When fluid is permitted to exhaust from the cylinder, the cutter bar drops by gravity to the working position in which it is shown in full lines in Fig. 2.

Provision is also made for partially counterbalancing the weight of the cutter bar 30 to ease its travel along the ground. For this purpose, an extensible coil spring 23 is disposed around the actuator 185 and anchored at one end to the plug 225. At its other end the spring is anchored to a plug 233 rigid with and closing the end of the cylinder 217.

Pressure fluid is supplied to and exhausted from the actuators 183 and 185 under control of a double valve V mounted on the tractor housing 16 and controlling connections with the tractor hydraulic system. For present purposes, it is sufficient to note that the valve has one operating lever 235 cotrolling fluid flow to and from the actuator 183 by way of a flexible conduit 237. A second valve operating lever 239 controls fluid flow to and from the actuator 185 by way of a flexible conduit 241.

It will be evident that by suitable manipulation of the valve levers 235 and 239, the drag bar 42 and cutter bar 30 may be raised and lowered independently to dispose them in various operating postures, or to raise them to an inoperative position for transport. Preferably, when being transported or otherwise out of service, the cutter bar is mechanically retained in inactive position by a chain 243 connected by an anchoring link 245 with the bracket 198 and having a suitable hook for connection with the cutter bar, as shown in broken lines in Fig. 2. When the cutter bar is to be used, the chain is disconnected therefrom and its free end is hooked on to the anchoring link 245, as shown in full lines in the drawing.

Figure 6:
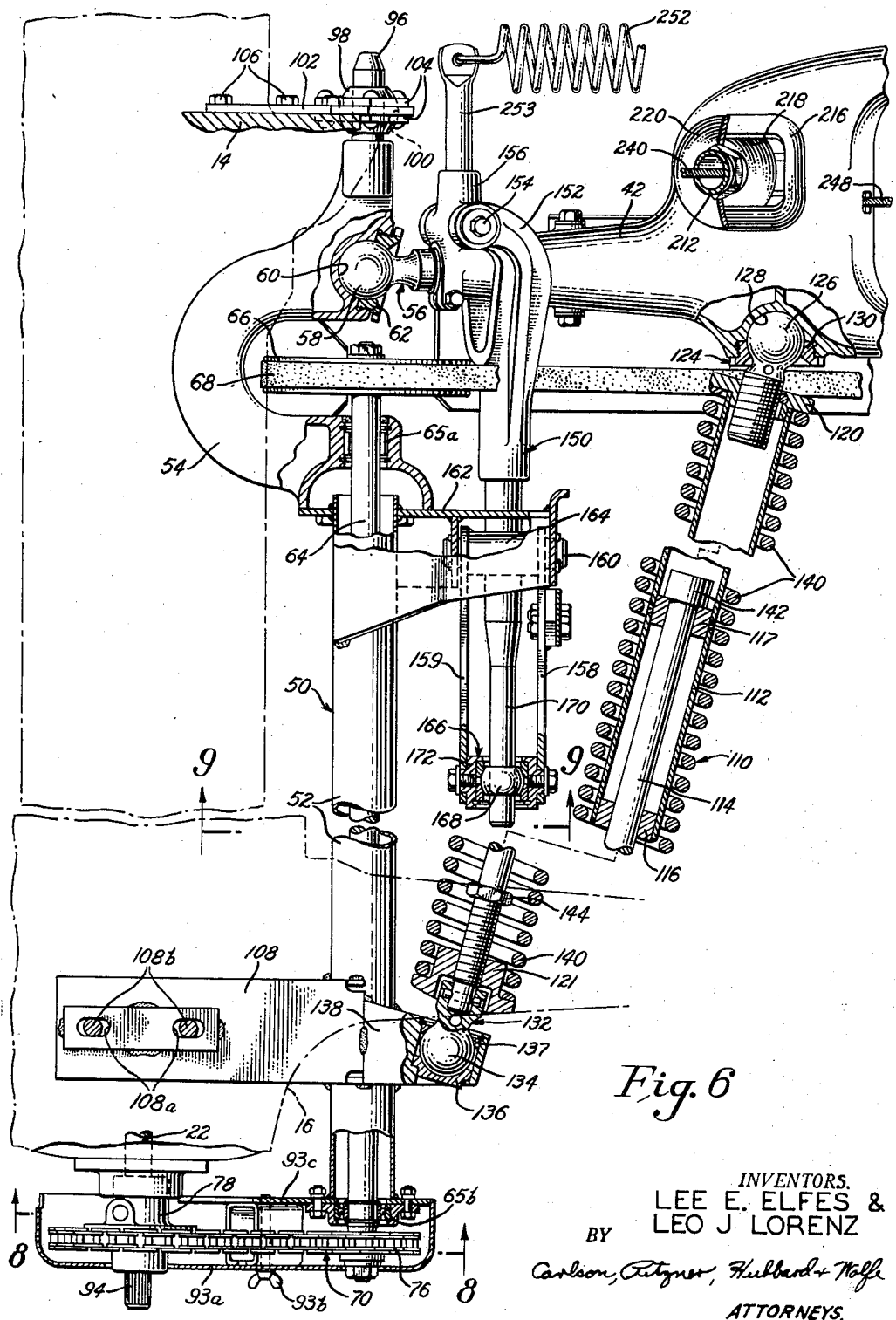
Fig. 6 is a sectional view similar to Fig. 3 but showing an earlier form of the mower.
Figure 9:
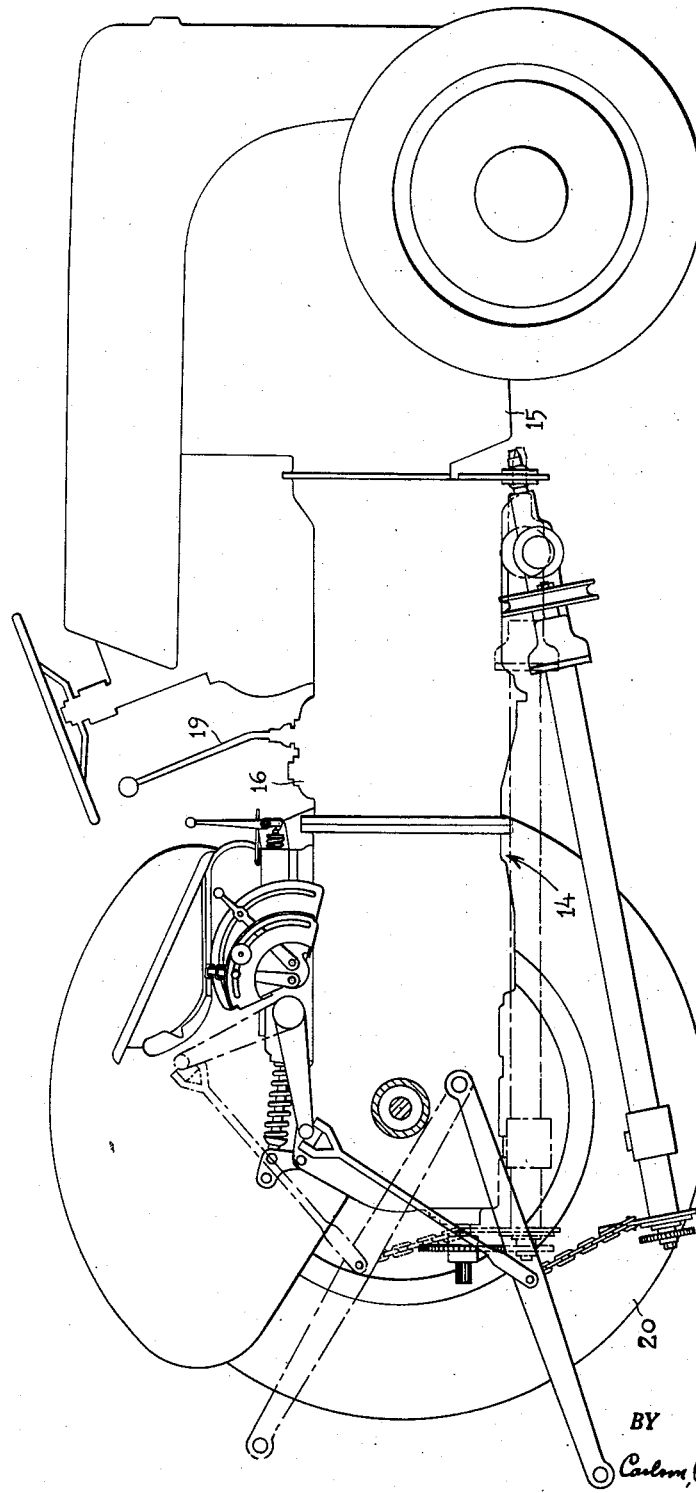
Fig. 9 is a fragmentary side view of the mower and a tractor showing one step in the process of mounting the mower on the tractor.

The modified actuating mechanism, shown in Figs. 6 and 7 of the drawings, differs from that above described in utilizing a single hydraulic actuator for raising and lowering the cutter bar and drag bar in predetermined sequence. This mechanism includes a counterbalance spring 196 secured to the bracket 198 at one end and having a connection at the other end with the drag bar 42. Within the spring is located a hydraulic ram or actuator 226 comprising a cylinder 230 fitted with the usual piston, which, in this instance, is connected by means of a tension member or cable 240, with a double cam sheave (not shown) enclosed within the body of the drag bar. Through suitable connections with the drivehead 34 the actuator is operable to first lift the drag bar and then to swing the cutter bar upwardly to the transport position. A spring 252 connected between a pin 253 fixed to the drag bar and a lever (not shown) fixed to the drivehead 34 counterbalances the weight of the cutter bar and drivehead.

Pressure fluid is supplied to and exhausted from the actuator 226 by way of a flexible conduit 266 under control of a valve 268 supported on the tractor housing, as shown in Fig. 7. A flexible conduit 274 conducts fluid from the tractor hydraulic system to the valve. The construction of the valve and its mode of operation are shown and described in detail in our earlier co-pending application above mentioned.

It will be evident from the foregoing that a mower constructed in accordance with the invention presents substantial advantages over previous side-mounted mowers. The simple, sturdy frame structure 50 supports all of the major components of the mower, including the cutter carrying drag bar 42, the break-back mechanism 33, the tilt mechanism 35 and the drive mechanism for transmitting power from the tractor power take-off shaft to the cutter bar drivehead. Moreover, those components are all assembled with the frame in a unitary structure adapted for mounting on and removal from the tractor as a unit. Since the mower parts are connected together at all times, the mower is easy to handle when dismounted and there is little likelihood of any parts becoming lost or misplaced.

Mounting of the mower is extremely simple since only two connections are required between the tractor and the frame structure and both are located for convenient accessibility. Thus, with the mower laid out on the ground, the tractor is run alongside and the front end of the frame is raised to insert the pin 96 in the apertured ball 98. No heavy lifting is involved since the cutter bar 30 and the drivehead 34 remain on the ground while the pin is being inserted.

After establishment of the front connection, the rear end portion of the frame structure is raised either manually or with the aid of the tractor lift mechanism, as previously described, and the bracket 108 is secured in place by the bolts 108b provided for the purpose. Before the bolts are tightened, the frame is shifted inwardly of the tractor and the drive chain 76 is placed over the sprockets 72 and 74. Sprocket 72 of course is mounted on the power take-off shaft as previously described and locked in place by the spring detent. When the drive chain is in place, the frame is shifted outwardly to properly tension it and is secured in fixed position by tightening the bolts 108b and screwing in the adjusting screw 111.

The final step in the mounting consists in attaching the actuator 183 to the bracket 198. To make this connection, the drivehead and cutter bar are raised sufficiently to allow the ball 191 to be inserted over the stud 207. The cutter bar is preferably rocked to the upper or raised position to minimize overhanging weight, which in any case is not particularly great since the frame structure itself is already supported by the tractor and only the drivehead, cutter bar and actuating means is lifted. It will be seen therefore that the complete installation may be effected quickly and with relatively little effort.

Important advantages are realized from the novel construction and relationship of parts in addition to the ease of mounting and dismounting the mower. Thus, the drive mechanism is materially simpler in construction than drive mechanisms heretofore required for side-mounted mowers. In particular, it is to be noted that no universal joints are required which reduces manufacturing costs and simplifies maintenance. Furthermore, the location of the main drive shaft within the frame structure makes it possible to utilize the pivoted mounting of the drag bar for break back, or in other words, to allow the drag bar and cutter bar to break back as a unit when the latter strikes an obstruction. This is particularly advantageous in providing more leverage when the obstruction is met by the inner end of the cutter bar.

The break-back mechanism itself operates in an advantageous manner since the force required to initiate a break back depends entirely upon the initial loading of the spring 140. The strength and adjustment of the spring is not subject to variation due to uncontrolled factors, such as corrosion, faulty or inadequate lubrication or accumulation of dirt on the working parts. Moreover, the frictional resistance offered by the spring-loaded member 110 is negligible. Accordingly, uniform, dependable operation of the break-back mechanism is insured under all conditions.

The improved tilt mechanism 35 provides a simple yet convenient means for regulating the fore-and-aft tilting of the cutter bar. Furthermore, it automatically adjusts the positions of the elements to maintain them in their proper operating relationship.

We claim as our invention:

1. In a mower for use with a tractor, the combination of an elongated frame assembled as a unit with the other components of the mower, means connecting the forward end of the frame structure to a tractor comprising means mountable on the tractor defining a socket, a ball supported for universal movement in said socket, said ball having a diametrically disposed aperture, and a pin rigid with said frame structure and engageable in the aperture in said ball, and means for connecting the rear end portion of the frame structure to the tractor comprising a rigid member extending laterally of the frame structure and adapted to be secured in transversely adjustable positions to the body of the tractor.

2. In a mower attachment for a tractor or the like, the combination comprising an elongated supporting member having a forwardly extending pin mounted on its front end, a ball having an aperture for receiving said pin, a front supporting element adapted to be mounted on the tractor and having a socket supporting the ball for universal pivoting movement, a rear supporting element operative to connect a rear portion of the supporting member to the tractor with the supporting member positioned alongside the tractor in a generally fore-and-aft direction, said rear supporting element being shiftable laterally relative to the tractor so as to adjust the angular position of the supporting member relative to the fore-and-aft axis of the tractor, a cutter bar, a ball and socket joint connecting the cutter bar to the supporting member for universal swinging and swiveling movement, means interposed between said supporting member and said cutter bar for releasably holding the cutter bar in a laterally extending position, and other means mounted on the supporting member and connecting with said joint for swiveling the cutter bar about the ball and socket joint for adjusting the tilt of the cutter bar.

3. A tractor mounted mower comprising in combination, an elongated frame supporting the component parts of the mower, means for mounting said frame in a generally fore-and-aft extending position on a tractor, said mounting means including a member secured to the tractor and defining a socket, an element carried at the forward end of said frame engageable in said socket, and a bracket carried adjacent the rear end of said frame adapted to be secured to the tractor and adjustable laterally with respect thereto to determine the positioning of the frame, said socket and element permitting pivoting movement of the frame in the adjustment of said bracket.

4. A tractor mounted mower as defined in claim 3 in which the frame carries a rearwardly projecting drive shaft adapted to be drivingly connected with the tractor power take-off shaft and in which the adjustment of the frame relative to the tractor serves to determine the tension of the drive connection between the tractor power take-off shaft and the drive shaft of the mower.

References Cited in the file of this patent

UNITED STATES PATENTS

| | | |
|---|---|---|
| 1,475,206 | Trolley | Nov. 27, 1923 |
| 1,855,838 | Kranick | Apr. 26, 1932 |
| 1,973,993 | Pearson | Sept. 18, 1934 |
| 2,130,795 | Gollnick | Sept. 20, 1938 |
| 2,204,335 | Wagner | June 11, 1940 |
| 2,328,838 | Oberlink | Sept. 7, 1943 |
| 2,504,686 | Hilblom | Apr. 18, 1950 |
| 2,568,931 | Paul | Sept. 25, 1951 |
| 2,628,467 | Gillespie | Feb. 17, 1953 |
| 2,700,861 | Goss | Feb. 1, 1955 |
| 2,726,502 | Hall | Dec. 13, 1955 |

FOREIGN PATENTS

| | | |
|---|---|---|
| 513,659 | Belgium | Sept. 15, 1952 |
| 687,889 | Great Britain | Feb. 25, 1953 |